(12) United States Patent
Shiau et al.

(10) Patent No.: US 11,781,897 B2
(45) Date of Patent: Oct. 10, 2023

(54) CONTACTLESS SENSOR SYSTEM AND METHOD FOR MEASURING FREE SURFACE AND PRESSURE FLOW IN A CONDUIT

(71) Applicants: Shi-En Shiau, Scottsdale, AZ (US); Brian Chia-Huan Shiau, Phoenix, AZ (US)

(72) Inventors: Shi-En Shiau, Scottsdale, AZ (US); Brian Chia-Huan Shiau, Phoenix, AZ (US)

( * ) Notice: Subject to any disclaimer, the term of this patent is extended or adjusted under 35 U.S.C. 154(b) by 189 days.

(21) Appl. No.: 17/419,496

(22) PCT Filed: Feb. 17, 2021

(86) PCT No.: PCT/US2021/018308
§ 371 (c)(1),
(2) Date: Jun. 29, 2021

(87) PCT Pub. No.: WO2022/093304
PCT Pub. Date: May 5, 2022

(65) Prior Publication Data
US 2023/0126909 A1 Apr. 27, 2023

Related U.S. Application Data

(60) Provisional application No. 63/204,876, filed on Nov. 2, 2020.

(51) Int. Cl.
*G01F 23/292* (2006.01)
*G01F 1/52* (2006.01)
(Continued)

(52) U.S. Cl.
CPC ............ *G01F 23/2928* (2013.01); *G01F 1/52* (2013.01); *G01S 17/08* (2013.01); *G01S 17/88* (2013.01)

(58) Field of Classification Search
CPC ............... G01F 1/52; G01F 23/2928
(Continued)

(56) References Cited

U.S. PATENT DOCUMENTS 2,283,906 A * 5/1942 Bennett ................. G01F 1/00
138/40
3,681,988 A * 8/1972 McNulty ................ G01F 1/005
73/861
(Continued)

FOREIGN PATENT DOCUMENTS

DE 10 2015 219 282 4/2017
JP 55140107 A * 11/1980
(Continued)

OTHER PUBLICATIONS

Lisa Caputo, International Preliminary Report on Patentability, PCT application PCT/US/2021/018308 (dated Nov. 30, 2022).

*Primary Examiner* — John Fitzgerald
(74) *Attorney, Agent, or Firm* — Venjuris, PC (57) ABSTRACT

The invention is embodied by a system that employs an inline metering station for (a) measuring both pressure flow and free surface flow in underground conduits without having to physically contact the fluid in the conduit, (b) operating under laminar flow and turbulent flow conditions, (c) providing continuous flow measurement, (d) offering remote data transmission to central control room or mobile device for real-time accessibility (e) detecting line sedimentary deposits (f), making computational adjustments, and (g) alerting maintenance for cleaning. In addition, embodiments of this invention are not disrupted by sewer pipe cleaning and are not limited by sewer flow velocity, depth, or Froude number.

The preferred system comprises a pair of risers (or "tubes") mounted on top of a buried underground conduit. On top of each riser is a sensor for measuring the distance between the (Continued)

sensor and the surface of the fluid that is flowing below the sensor (the "sensor-fluid distance"). Using as-built conditions, the sensor-fluid distance can be used to find real-time flow depth and velocity through the underground conduit.

17 Claims, 9 Drawing Sheets

(51) Int. Cl.
  *G01S 17/08* (2006.01)
  *G01S 17/88* (2006.01)
(58) Field of Classification Search
  USPC .................................................. 73/215, 861
  See application file for complete search history.

(56) References Cited

U.S. PATENT DOCUMENTS

| | | | | |
|---|---|---|---|---|
| 4,026,151 | A * | 5/1977 | Fitzgerald | G01F 23/30 73/290 R |
| 5,063,776 | A * | 11/1991 | Zanker | G01F 23/2962 73/152.21 |
| 5,333,497 | A * | 8/1994 | Braend et al. | G01F 3/36 73/219 |
| 5,617,757 | A | 4/1997 | Horner | |
| 5,754,495 | A * | 5/1998 | Skinner | G01S 15/10 367/99 |
| 7,836,760 | B2 * | 11/2010 | Saylor | G01D 21/00 73/861.71 |
| 8,215,183 | B2 * | 7/2012 | Petroff | G01F 1/663 73/861.28 |
| 10,072,470 | B2 * | 9/2018 | Henriksen | G01P 5/005 |
| 10,408,662 | B2 * | 9/2019 | Tsuboi | G01F 23/2928 |
| 2004/0060365 | A1 * | 4/2004 | Crudge | G01F 1/712 73/861 |
| 2010/0315654 | A1 * | 12/2010 | Berger | G01F 23/292 356/625 |
| 2015/0377716 | A1 | 12/2015 | Kulkarni et al. | |

FOREIGN PATENT DOCUMENTS

| | | | |
|---|---|---|---|
| JP | 57128852 A | * | 8/1982 |
| JP | 58113714 A | * | 6/1983 |
| JP | 2001 133303 | | 5/2001 |
| KR | 10 2015 0071750 | | 6/2015 |
| KR | 10 2019 0102656 | | 9/2019 |

* cited by examiner

Figure 20 – Dehumidifier

Figure 21 - 24 hours sewer flow

Figure 22 – Snell Law Equation

Figure 23 – Application of Snell Law to last timing reading (last reflection received)

CONTACTLESS SENSOR SYSTEM AND METHOD FOR MEASURING FREE SURFACE AND PRESSURE FLOW IN A CONDUIT

FIELD OF THE INVENTION

The present invention relates to devices for measuring fluid flow inside a conduit. More specifically, this invention relates to measuring free surface flow and pressure flow inside an underground conduit.

BACKGROUND

A wastewater system is comprised of three parts: (1) a collection system, (2) a wastewater treatment plant, and (3) effluent discharges. The owner of the wastewater system typically collects fees from the users of the system to finance operating costs, maintenance costs, and capital improvement expenditures. As the population using the wastewater system grows and industrial and commercial use of water expands, wastewater flow increases, and capital improvements are required to expand the wastewater system.

Modern sewer systems do not receive stormwater (surface drainage from rainfall or snowmelt) by design—they are dedicated to wastewater (consisting of domestic, commercial, and industrial wastewater). These dedicated sewer systems may unintentionally receive stormwater from infiltration at pipe joints or manholes due to aging or inadequate construction. Additionally, approximately 12% of US sewage systems are serviced by combined sewer systems that carry both wastewater and storm water in a single pipe to a treatment facility.

Sewer systems function to convey domestic, commercial, and industrial wastewater to a treatment facility. When stormwater enters the sewer system, there is risk that total flow can exceed the capacity of the sewer or the treatment facilities. When this occurs, the overflow may drain to surface water bodies, such as lakes, rivers, estuaries, or coastal waters, and contaminate natural water bodies with sewage.

Sewage overflows contain contaminants that include: pathogens, oxygen-demanding pollutants, suspended solids, nutrients, toxic materials, and floatable matter. The presence of contaminants in the flows can cause a variety of adverse effects on the physical characteristics of surface water, impair the viability of aquatic habitats, and pose a potential threat to drinking water supplies.

EPA defines "wet weather flow" as the combined flows of sewage and the infiltrated stormwater. The EPA requires wastewater operators to maintain sufficient capacity to accommodate wet weather flow. Therefore, it is critical for the operator of the wastewater system to know (1) the total amount of water flowing into the plant and (2) the total amount of water flowing in the interceptors and collectors so that the operators can predict and mitigate the risk of an overflow.

Another benefit of knowing the amount of flow in the system is to establish a basis for cost sharing when multiple entities jointly share wastewater treatment facilities and/or collection systems. In addition, long-term real-time wastewater flow monitoring plays an important role for planning the expansion of treatment plants and collection systems Flow may be measured on an instantaneous or a continuous basis. Instantaneous flow measurements can be obtained by using a primary flow device. The primary flow device produces predictable hydraulic responses based on the flow rate of water through it. Examples of such devices include weirs and flumes that relate water depth (head) to flow; Venturi and orifice type meters that relate differential pressure to flow; and magnetic flow meters that relate induced electric voltage to flow. These standard primary flow devices, if installed and built according to established standards, have proven to be accurate. Continuous flow measurement systems generally consist of a primary flow device, a flow sensor, transmitter, flow recorder, and totalizer.

In prior art, a Parshall Flume has been the most reliable wastewater flow measurement device. A Parshall flume is an open channel flow metering device developed to measure the amount of free surface flows. In physics, a free surface flow is used to describe fluid flowing partially full inside a conduit, which the surface of the flowing fluid is subjected to both zero perpendicular normal stress and parallel shear stress. It is set up as a fixed hydraulic structure and used to measure volumetric flow rate in industrial discharges, municipal sewer lines, and influent/effluent flows in wastewater treatment plants.

The Parshall Flume accelerates flow through contracting the parallel sidewalls and dropping the floor at the flume throat. Under free-flow conditions, the depth of water at a specified location upstream of the flume throat can enable calculation of the rate of flow. The Parshall Flume is not patented. The discharge tables are publicly available information.

If the flow exceeds a flume's flow capacity, then submergence occurs and the flow rates must be adjusted according to the factors provided by the respective manufacturer. If submergence beyond the manufacturer's specified limits occurs, then point level measurements must be taken at both the primary and secondary points of measurement and a submergence correction must be applied to the flow equations. It is important to note that the secondary point of measurement (Hb) for a Parshall Flume is located in the throat. Measuring Hb can be difficult because the flow in the throat of the flume is turbulent and prone to fluctuations in the water level. 90% adjustment is considered the upper limit for which corrections for submerged flows are practical. Due to the geometric variations of the Parshall Flume, sedimentary deposits may accumulate and must be cleaned for accurate readings.

Among prior art, the Parshall Flume is considered the most reliable system and is used widely at wastewater treatment plants in the United States. For inline flow measurement (such as in a sewer collection system), the Parshall Flume is placed in an underground chamber. This placement is cumbersome because it requires frequent inspection and removal of sedimentary deposits.

In lieu of manually reading flow depth, a flow sensor can be installed to measure the hydraulic responses of the primary flow measurement device and transmit the responses to the recording system. Typically, sensors include ultrasonic transmitters, floats, pressure transducers, capacitance probes, differential pressure cells, electromagnetic cells, etc. The sensor signal generally is converted using mechanical, electro-mechanical, or electronic systems into units of flow that are recorded directly on a chart or transmitted into a data system. Systems that utilize a recorder generally are equipped with a flow totalizer that displays the total flow on a real-time basis.

Many flow measuring devices are contact-based, continuous flow measurement systems with sensors that are submerged in the sewage flow. These sensors are prone to damage and/or reduced reliability and accuracy due to sedimentary deposits that accumulate on the sensors. As a result, the sensors require frequent cleaning, maintenance, and even repair and replacement.

Other than the traditional Parshall Flume, there are a few contactless flow meter sensors available on the market. These sensors operate within a manhole and include velocity laser sensors and depth sensors. These sensors derive flow rate by measuring depth (area) and multiplying with the measured velocities. The use of depth-velocity flow sensors has some draw backs:

(1) velocities acquired by depth-velocity flow sensors may not be accurate and are not equivalent to the mean velocity of the sewage flow in a conduit,
(2) depth-velocity flow sensors do not work for flow surged manholes,
(3) measurements are disrupted during maintenance,
(4) maintenance costs are expensive, and
(5) lens condensation is difficult to mitigate when the sensors are installed in an open chamber and/or manhole.

Most importantly, all existing flow meters measure free surface flow but are not able to measure pressure flow.

SUMMARY OF INVENTION

The invention is embodied by an inline metering station for measuring both pressure flow and free surface flow in underground fluid conduits. Some of the advantages of this invention include (a) not having to physically contact the fluid in the conduit, (b) operating under both laminar flow and turbulent flow conditions, (c) providing continuous flow measurement, (d) offering remote data transmission to central control room or mobile device for real-time accessibility, (e) detecting line sedimentary deposits, (0 making computational adjustments, and (g) alerting maintenance for cleaning. In addition, embodiments of this invention are not disrupted by sewer pipe cleaning and are not limited by sewer flow velocity, depth, or Froude number.

The preferred system comprises a pair of risers (or "tubes") mounted on top of a buried underground conduit. On top of each riser is a distance-measuring sensor for measuring the distance between the sensor and the surface of the fluid that is flowing below the sensor (the "sensor-fluid distance"). The sensor-fluid distance can be used to find flow depth. In this way, the sensor-fluid distance may indicate that the conduit is in a free surface flow condition (the conduit is not full). Or, the sensor-fluid distance may indicate that the conduit is in a pressure flow condition (the conduit is full). Knowing the sensor-fluid distance at two locations at the same point in time is important because those two data points can be used to determine free surface flow and pressure flow when combined with as-built conditions and friction loss equations known in the art. For the purposes of this specification, the sensor-fluid distance at the first riser is referred to as the "first distance," and the sensor-fluid distance at the second riser is referred to as the "second distance."

The two risers are preferably located between two manholes. Each riser should be located close to a manhole but at a distance such that there is no flow disruption and/or backwater from the manhole in the segment of the conduit that is measured by the riser. Ordinarily, this distance would be at least one hundred feet. No lateral inflows, longitudinal pipe slope changes, horizontal direction changes, and/or pipe size/material changes between the risers. The two risers should be separated from each other in order to calculating the energy loss between the two tubes. Ordinarily, the two risers should be separated by 10 times the inverse of the slope of the conduit or 100 feet whichever is longer. For the purposes of this specification, the distance between the two risers is referred to as the "third distance," and the distance between a manhole and a riser is referred to as the "fourth distance."

The two risers are preferably located between two manholes. Each riser should be located close to a manhole but at a distance such that there is no flow disruption and/or backwater from the manhole in the segment of the conduit that is measured by the riser. Ordinarily, this distance would be at least one hundred feet. No lateral inflows, longitudinal pipe slope changes, horizontal direction changes, and/or pipe size/material changes between the risers. The two risers should be separated from each other in order to calculating the energy loss between the two tubes. Ordinarily, the two risers should be separated by 10 times the inverse of the slope of the conduit or 100 feet whichever is longer.

The distance-measuring sensor is preferably housed in an instrument compartment at the top of each riser. The instrument compartment may also comprise other sensory devices, recording devices, transmitting devices and other auxiliary equipment. Preferably, the system operates as follows:

A data recorder logs the sensor-fluid distance measurements at each of the two risers with time stamps.

A transmitter sends the log data, wirelessly or through a wire connection, to a data processor that may be remotely located.

A data processor calculates the actual flow rates and velocities of the fluid using the log data that is received from the transmitter. The calculations are performed using well documented and tested friction loss equations.

In this way, the preferred system can provide an automated monitoring system that measures fluid flow inside a conduit without having to contact the flow.

One key benefit of the invention is to provide flow measurements continuously in an underground conduit over a long period, regardless of how the flow behaves, whether free surface and/or fully submerged.

Another key benefit is that actual flow data can be used by Municipalities and sanitary districts ("stakeholders") to manage their sewer systems using the EPA's Storm Water Management Model (SWMM). Actual flow data gathered from key sewer lines throughout a contributing sewage watershed can be critical to calibrating the SWMM and establishing diurnal curves according to population and types of development. With better modeling, stakeholders can identify areas with deficiencies and plan for sewer line and wastewater treatment plant expansion.

BRIEF DESCRIPTION OF THE DRAWINGS

A clear understanding of the key features of the invention summarized above are referenced to the appended drawings that illustrate the method and system of the invention. It will be understood that such drawings depict preferred embodiments of the invention and, therefore, are not to be considered as limiting its scope regarding other embodiments that the invention is capable of contemplating. Accordingly.

DETAILED DESCRIPTION OF THE PREFERRED EMBODIMENTS

Figure 1:
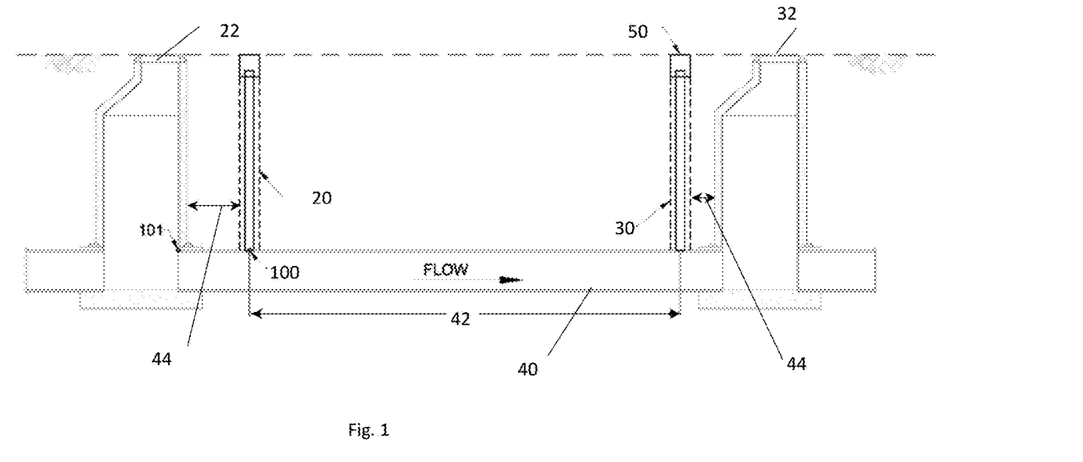
FIG. 1 illustrates a preferred embodiment of the invention, featuring two risers connected to an underground conduit.
Figure 2:
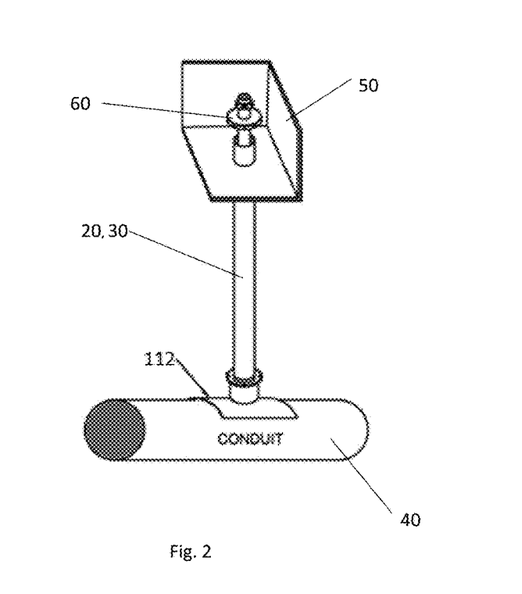
FIG. 2 illustrates an embodiment of single riser with an instrument compartment housing a distance measuring sensor.

An embodiment of the preferred system 10 is shown in FIG. 1. Broadly, the preferred system 10 comprises a first riser 20 and a second riser 30. At the bottom (or "distal end"), the first and second risers 20, 30 are each connected to an underground conduit 40. On the top (or "proximal end") of each riser 20, 30 is an instrument compartment (or "housing") 50.

The instrument compartment 50 preferably houses sensors and processors for measuring, verifying, recording, and calculating the flow depths in the underground conduit 40 beneath each riser 20, 30. As previously noted, a distance measuring sensor is critical to this invention. In short, the distance-measuring sensor measures the distance to the fluid level in the underground conduit 40 (free flow) or to the fluid level in the riser 20, 30 (pressure flow).

The preferred distance-measuring sensor 60 is an optical measuring device, preferably an ultra-accurate laser or an ultrasonic proximity meter. The preferred distance-measuring sensor 60 emits an infrared laser light from its emitting sensor that can reflect off the liquid surface in the conduit 40 and then return to the receiving lens of the sensor. The exact distance is then calculated by comparing the return time ("time of flight") to the speed-of-light constant. For example, the optical measuring device sold under the trademark TruSense, model S-300, has been found suitable for this purpose. Those in the art will recognize other suitable measuring devices. The choice between the two is selected based on the distance that must be measured.

The distance-measuring sensor 60 is preferably made from materials that are corrosion and water resistant, such as IP67 protection (from water ingress at depths of 15 cm to 1 meter for 30 minutes).

The distance-measuring sensor 60 preferably records time stamps for the beam's travel time (or "flight time") from the beam emission to the flow surface, the reflection from the flow, and subsequent reception by the sensor. Two flight times are of primary interest. The first flight time is the flight time between the distance measuring sensor 60 and the fluid surface below. The last flight time is the flight time between the distance measuring sensor 60 and the bottom of the inside of the conduit 40 or the top of the sediment at the bottom of the conduit 40, whichever is higher.

Likewise, two distances are of primary interest. The first optical distance 62 is the distance from the distance-measuring sensor 60 to the fluid surface below (see H11 in FIG. 15). The second optical distance 66 is the distance from the measuring sensor 60 to the bottom of the fluid (see H10 in FIG. 15). If there is no sediment in the bottom of conduit 40 the second optical distance 66 will equal the as-built distance 66. If there is sediment deposited on the bottom of conduit 40, the second optical distance 66 will be less than the as-built distance 66.

To obtain the flow depth 64 inside conduit 40, a user would subtract the first optical distance 62 from the as-built distance 66. To obtain the depth of sediment deposit, a user would subtract the second optical distance 66 from the as-built distance 66. The presence of sedimentary deposits may require cleaning the sewer or adjustments to the flow depth.

Preferred steps to determine flow depth and sediment depth:

1. Connect a bottom end of the riser to an underground conduit
2. Orient the riser so that it is perpendicular to the apex of the conduit
3. Connect a measuring sensor (e.g. TruSense, model S-300) to the top
4. Program the sensor's interface software for RS-232 SCII commands for WIFI transmission and communication, which includes time stamped readings of the first flight time and the last flight time.
5. Collect continuous first and last flight time readings for the first 72 hours after the sewer was cleaned.
6. For a specific time stamp, the first flight time–the last flight time=flight time travelled in the water.
7. Vw travel speed in the water with consideration of obligue reflection angles at a specific time=water depth/(time travelled in the water/2)

8. The first flight time reading is the travel time to the fluid surface below and back (2*(H11), FIG. 15 and it can calculate the distance from the equation D=v*T/2)
9. The last flight time reading is the flight time to the bottom of inside of the conduit (or top of sediment in conduit if present) and back (2*H10).
10. If (the last flight time reading−the first flight time reading)/(2*Vw) is less than (H10−H11), there are sediment deposits. The sediment deposit thickness can be approximated by (H10−H11)−(the last flight time reading−the first flight time reading)/(2*Vw)

Figures 21, 24:
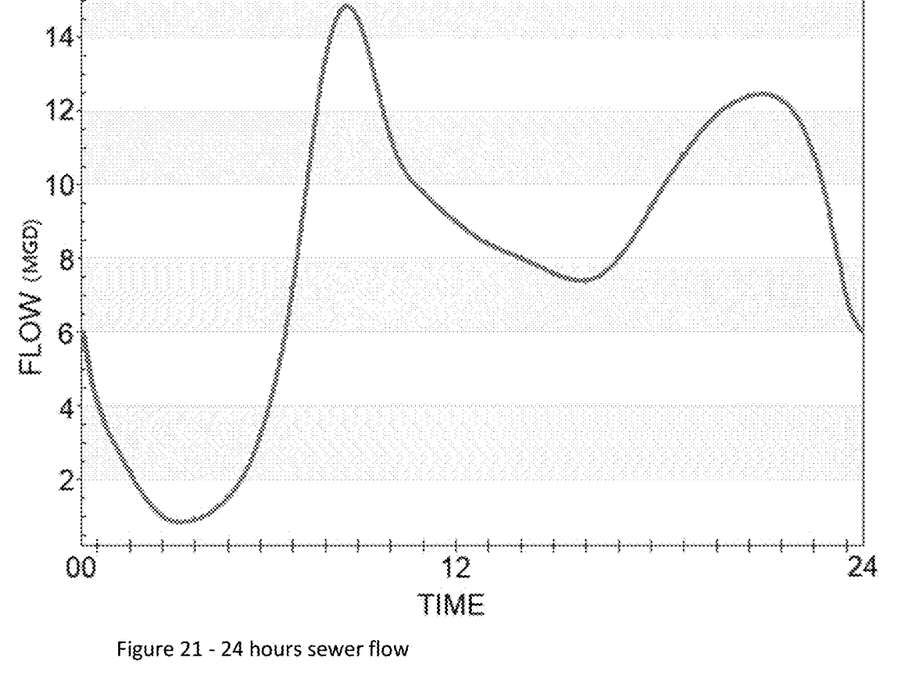
FIG. 21 illustrates an example of sewer flow (MGD) vs. Time (hours).
FIG. 24 illustrates dimensions referenced in Example 1—Open Channel Flow.

Sewage features seasonal pattern for a fixed and known period. However, 24 hours of sewage flow reflects close similarity on day to day rates and time curves. (FIG. 21) A cyclic pattern in wastewater flow exists with distinguishable patterns between summer peak water and winter low water usages.

The first and last flight time readings after a clean up of the sewer sediment between the risers provides baseline conditions without sedimentation.

Verification and comparison of the last flight time readings is based on the Snell's law (FIGS. 22 and 23, also known as Snell-Descartes law and the law of refraction), which is a formula used to describe the relationship between the angles of incidence and refraction, when referring to light or other waves passing through a boundary between two different isotropic media, such as water, glass, or air. Consequently, The last reading time based on the Snell Law including beam penetrates water surface, deflects through the air/water interface, reflects from the bottom, deflects through the water/air interface and reach the sensor receiver.

Figure 22:
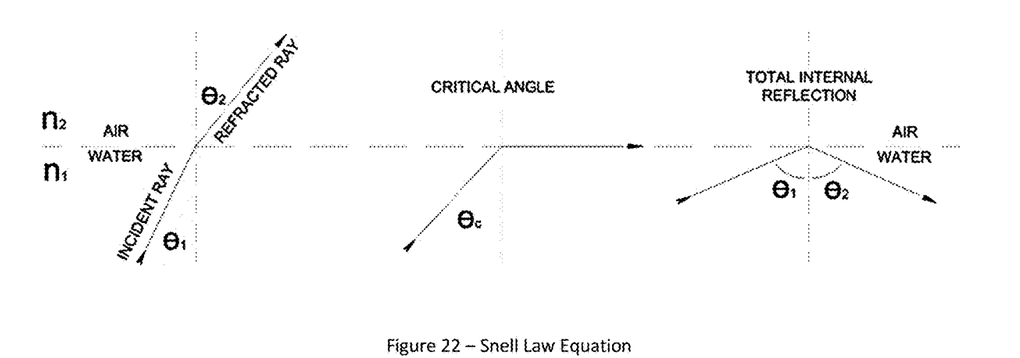
FIG. 22 illustrates Snell's law.
Figure 23:
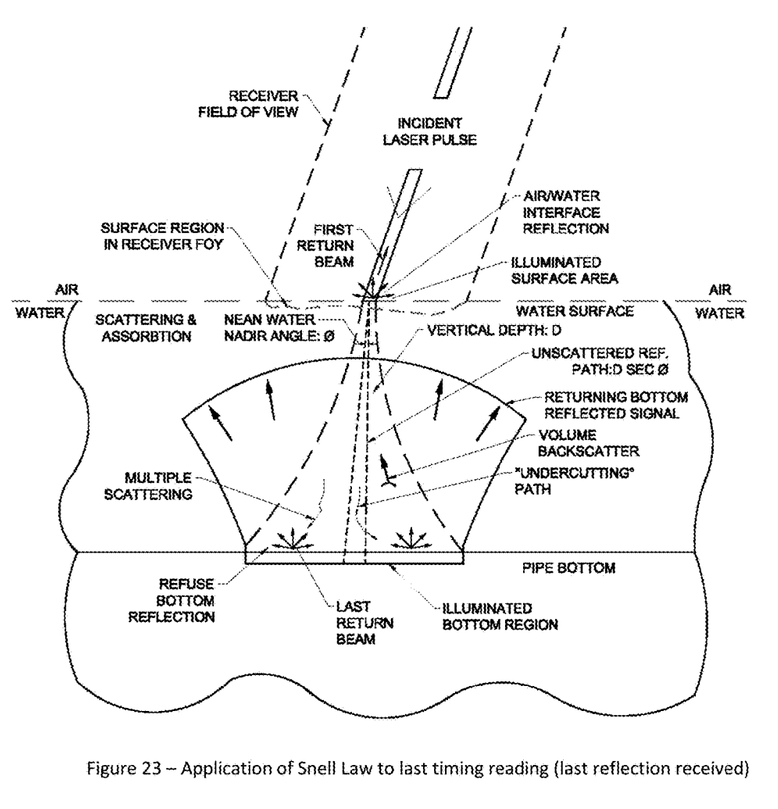
FIG. 23 illustrate an application of Snell's law to flight path.
Figure 24:
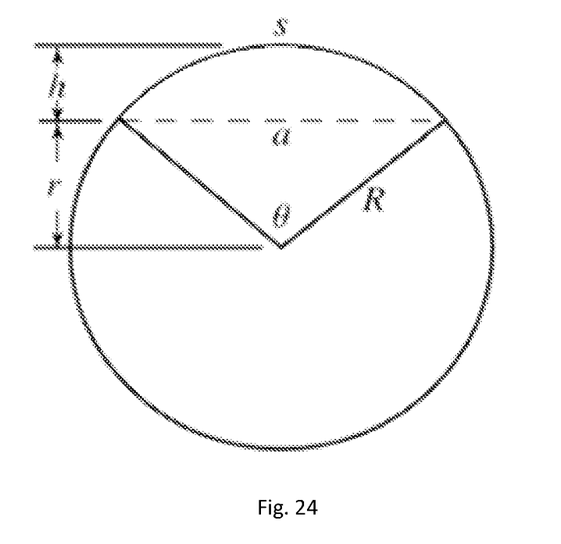
Figure 25:
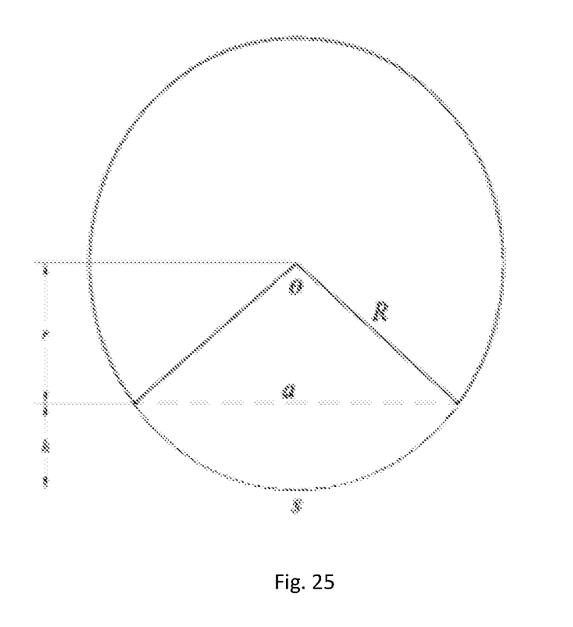
FIG. 25 illustrates dimensions referenced in Example 1—Open Channel Flow.

Snell's law states that the ratio of the sines of the angles of incidence and refraction is equivalent to the ratio of phase velocities in the two media, or equivalent to the reciprocal of the ratio of the indices of refraction:

$$\sin\theta 2/\sin\theta 1 = v2/v1 = n1/n2$$

with each θ as the angle measured from the normal of the boundary, v as the velocity of light in the respective medium (SI units are meters per second, or m/s), and n as the refractive index (which is unitless) of the respective medium.

Sediment deposits are mostly mushier, softer, irregular and coarser than plastic conduit bottom. Most likely sediment deposited in the bottom absorbs a majority of the beam with little beam reflection. However, with a beam diffuser the reflection would cover a larger bottom area that may generate sufficient reflecting beams for the last reading.

Figure 19:
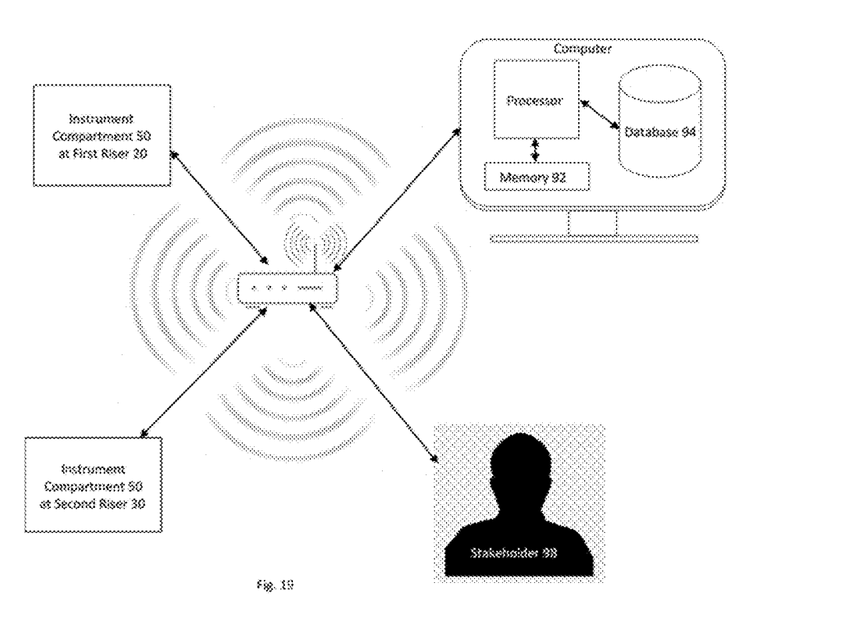
FIG. 19 illustrates an embodiment of preferred communication flow between devices located in the instrument compartments at the first and second risers, a computer and a stakeholder.

As illustrated in FIG. 19, the sensor data can be collected as small as 10 milliseconds if necessary, time stamped data can be transmitted wirelessly or via physical connection to a control center for data processing to generate real-time flow quantities and velocities. The data and resulting calculations can be transmitted to mobile devices such as smart phones in the field. In this way, stakeholders 98 can receive this actual flow data in real time to manage their sewer systems.

Figure 3:
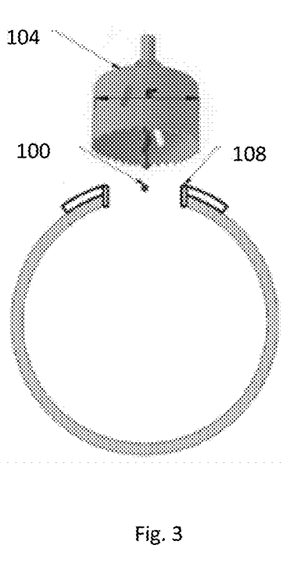
FIG. 3 illustrates an embodiment of a cutting a hole through the apex of a conduit and mounting a saddle-type flange.
Figure 4:
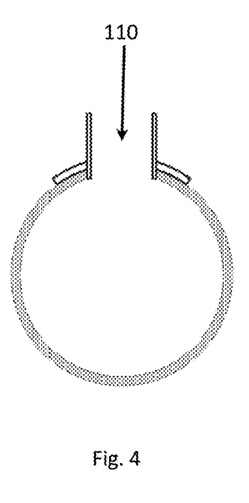
FIG. 4 illustrates an an opening through a saddle-type flange for receiving a riser.

FIG. 3 illustrates the preferred way to attach a riser to a conduit. As indicted, mark the apex 100 of the exposed conduit 40 and record the apex elevation with reference to the adjacent manhole's culvert invert elevation. Preferably, these measurements would be performed by a certified surveyor. Next, select a core drill bit size 104 that matches the riser seat size 108. Mount a core drilling stand with the core drill centered at the apex 100. Core drill the culvert and remove the cut-out piece of the culvert. Measure the thickness of the cut-out piece of culvert to ascertain the thickness of the conduit 40.

Figures 5, 6:
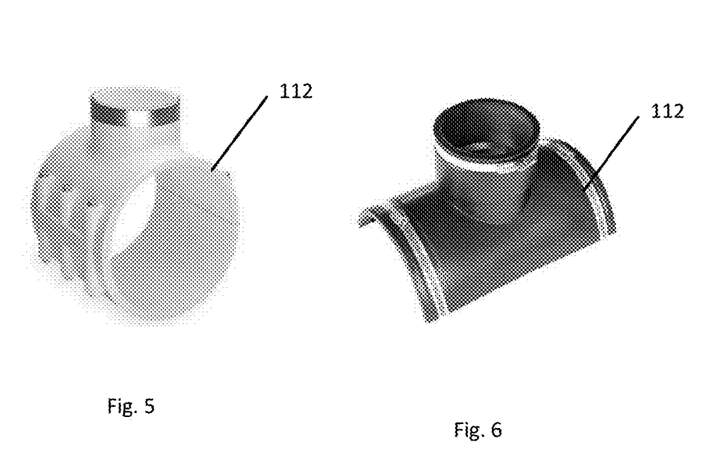
FIG. 5 illustrates a full-pipe riser saddle.
FIG. 6 illustrates an partial pipe saddle.

Next, mount commercially available or custom-made connection saddle 112. This could be a full pipe riser saddle (see FIG. 5) or a partial pipe saddle (FIG. 6). It is preferred to adhere the saddle to onto the culvert hole 110 hydrogen sulfide corrosion proof adhesive (or other suitable waterproof adhesive) to firmly secure the saddle to the conduit. Those in the art will recognize other ways to core a hole into the conduit and connect the riser.

Figure 7:
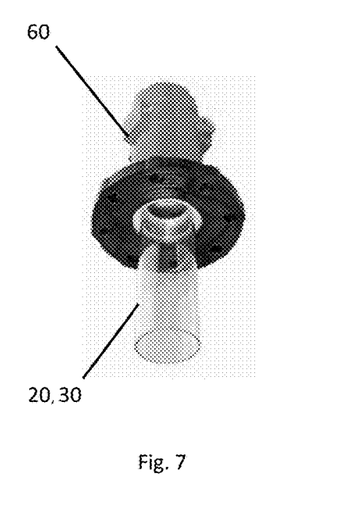
FIG. 7 illustrates an embodiment of a mounting sensor on a riser with a flange.

FIG. 7 illustrates the preferred mounting assembly for the distance measuring sensor 60. The preferred way to mount the distance-measuring sensor 60 to the top of the riser is with a sealed flange such that no foul odor is released into the air.

Referring back to FIG. 1, the risers 20, 30 are oriented perpendicular to the apex of the conduit 40, preferably within +/−three degrees of perpendicular. The risers are erected vertically over the conduit 40 so that the beam 80 (see FIG. 15) of the distance-measuring sensor 60 is perpendicular to the slope of the conduit 40. The set up should optimize the beam's reflection from the fluid flow inside the conduit 40 to the sensor 60 receiver to enable accurate measurement of the distance.

The diameter of the riser 20, 30 should be sized such that (1) the distance-measuring sensor's outgoing laser/ultrasonic beams 80 do not contact the inside walls of the riser (see FIG. 8) and (2) the first reflecting beam (in opposite direction to beam 80) can travel directly back to the sensor's receiver to ascertain the correct distance (FIG. 15) between the distance-measuring sensor lens and the fluid surface 62.

Each riser 20, 30 is preferably at least 3 feet long. There is no limitation on the possible riser length. Sewer lines are normally buried 4 feet to 30 feet below the ground surface. However, the invention can be used for measuring other gravity/pressure flows such as irrigation water, stormwater, and raw water with burial depth ranging from barely covered to 600 feet deep, such as the NYC aqueduct that transports lake water from hundreds of miles away.

The useful length of the riser 20, 30 is dependent on the accuracy of the sensor that is mounted in the tube. Some sensors can measure with an accuracy of 0.01 mm at a maximum distance of 12 inches, while some sensors can measure with an accuracy of +/−0.4 inch at a maximum distance of 600 feet. The usable tube diameter is dependent on the sensor's radiant. As shown in FIGS. 8-11, the width of the beam from the distance-measuring sensor 60 enlarges as it moves away from its source (emitter). The diameter of the tube must be large enough so that the beam does not contact the wall of the tube. Compare, e.g., FIGS. 8-9 with FIGS. 10-11. The design should set the elevation of the sensor and diameter of the riser accordingly per sensor manufacturer's specification.

Figure 8:
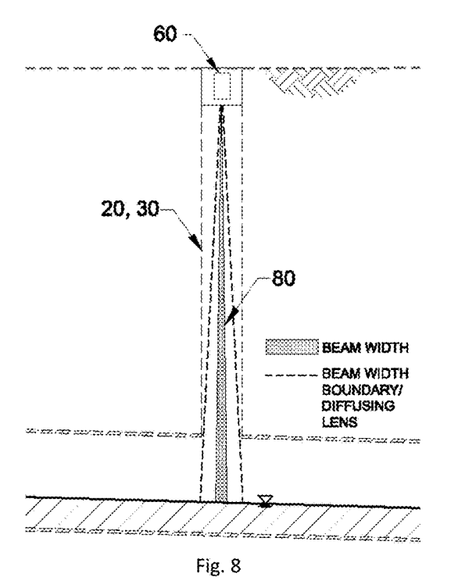
FIG. 8 illustrates a side-sectional view of one embodiment of a distance-measuring sensor placement in the riser and the importance of riser diameter.
Figure 9:
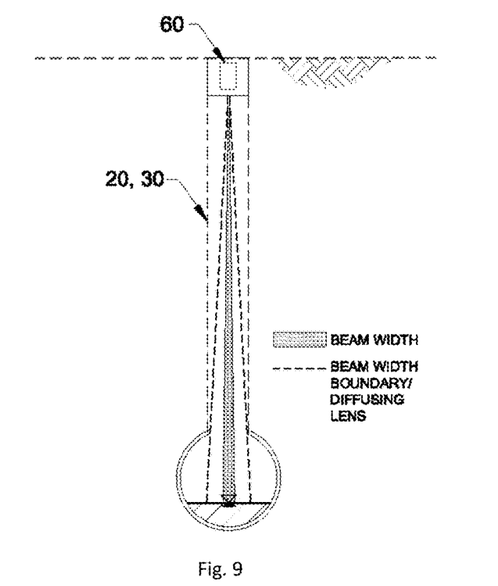
FIG. 9 illustrates a cross-sectional view of one embodiment of a distance-measuring sensor placement in the riser and the importance of riser diameter.
Figure 10:
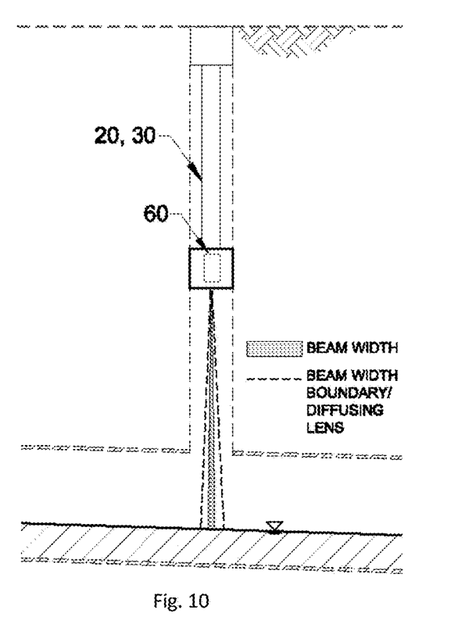
FIG. 10 illustrates a side-sectional view of another embodiment of a distance-measuring sensor placement in the riser and the importance of riser diameter where moving the sensor further down the riser keeps the emitted beam width smaller at the top of the conduit.
Figure 11:
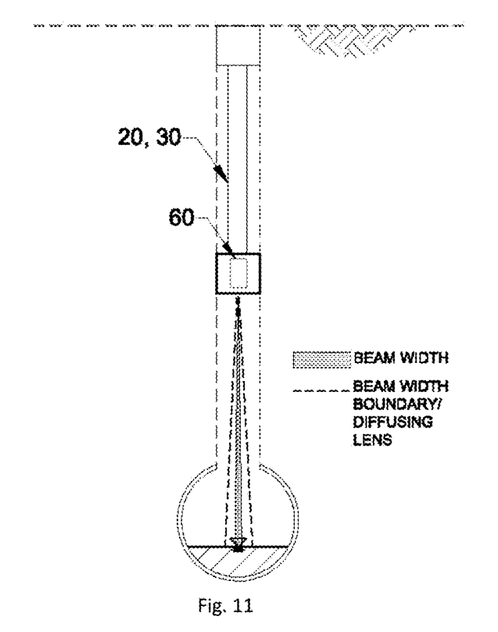
FIG. 11 illustrates a cross-sectional view of of another embodiment a distance-measuring sensor placement in the riser and the importance of riser diameter where moving the sensor further down the riser keeps the emitted beam width smaller at the top of the conduit.

Optionally, the distance-measuring sensor 60 can have a diffusing lens. A diffusing lens provides a broader contact area 82 that provides a better coverage on surface disturbance for the second and the third return times' measurement. However, as shown in FIG. 8, the diffusing lens typically increases the beam width 82. So, for instances where a diffusing lens may be used, the riser diameter may need to be adjusted to accommodate a correspondingly wider beam width 82. Alternatively, as shown in FIGS. 10-11, the distance-measuring sensor 60 can be positioned below ground level and closer to the conduit to keep the beam width within the inside diameter of the riser 20, 30.

Figure 20:
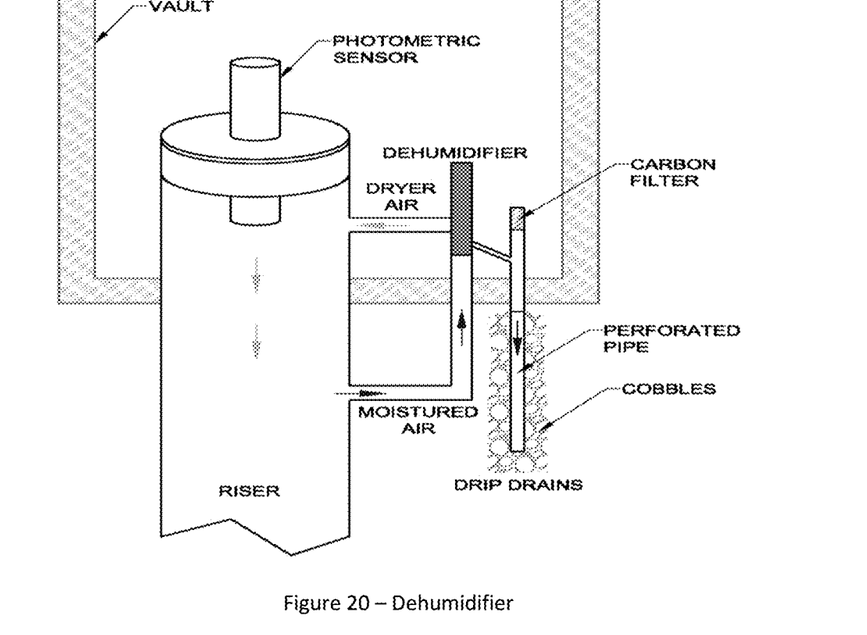
FIG. 20 illustrates a preferred dehumidifying system.

It is important to keep the measuring sensor 60 away from the conduit 40 to keep condensation from forming on the lens of the distance-measuring sensor 60. Optionally, a dehumidifying system can be used. As shown in FIG. 20, the preferred dehumidifying system is connected to riser 20, 30 near the distance-measuring sensor 60. The dehumidifier system preferably comprises two humidity sensors 120, 124, a dehumidifier 128, and a recirculating pipe 132 to prevent condensation from forming near the distance-measuring sensor's lenses. The first humidity sensor 120 should be placed near the distance senor. The second humidity sensor 124 should be placed at the suction end of the recirculating pipe 132. The recirculating pipe 132 should be placed with the suction end away from the sensor and the discharge end immediately below the distance-measuring sensor, with wastewater drips directed away via drip drain 136 to a perforated pipe 140 outside of the instrument compartment 50. A carbon filter 142 and cobbles 144 can also be used as shown.

Instrument Compartment

Figures 12, 13:
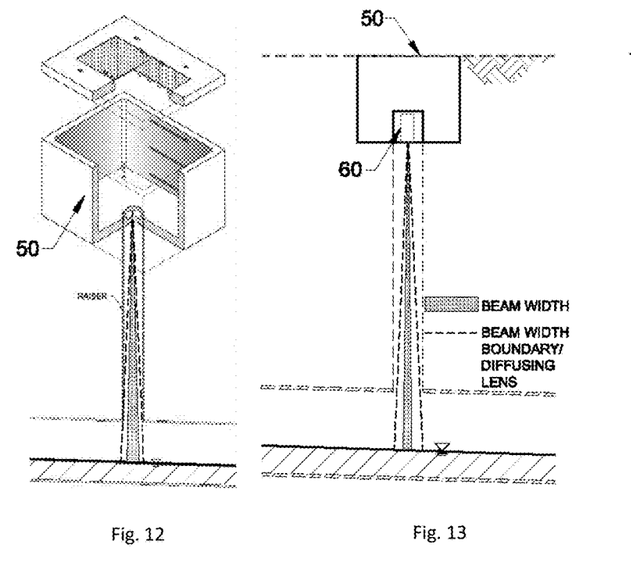
FIG. 12 illustrates an embodiment of a sensor housing compartment.
FIG. 13 illustrates a side sectional view of an embodiment of a sensor housing compartment.
Figure 14:
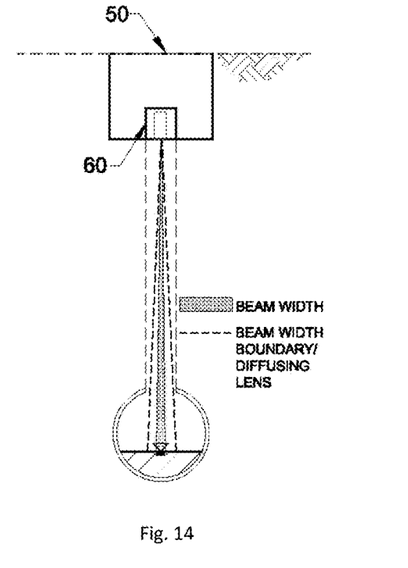
FIG. 14 illustrates a cross-sectional view of an embodiment of a sensor housing compartment.

As shown in FIGS. 12-14, the instrument compartment 50 is preferably a water-tight utility vault that meets the requirements of the regulatory jurisdictions for direct HS-20 traffic load pavement installation. In addition to the distance-measuring sensor 60, the instrument compartment 50 preferably also houses an on-site processor 90, memory 92, database 94 (see FIG. 19) for calculating the flow quantity using the time stamps of the flow-depth measurements, the known invert elevations, the slope, the distance between the sensors, and the conduit material. Alternatively, the instrument compartment could house a transmitter to transmit data to a remote processor and database. It is preferred that information is transmitted through a wireless network 96, but a hard wired transmission could also work. Optionally, the instrument compartment 50 could house other auxiliary equipment.

The risers 20, 30 are preferably located between two manholes 22, 32. Each riser should be located close to a manhole but at a distance such that there is no flow disruption and/or backwater from the manhole in the segment of the conduit that is measured by the riser. It is important that between the two risers, there are no lateral inflows, no longitudinal pipe slope changes, and no pipe size/material changes. The two risers 20, 30 should be separated from each other in order to calculate the energy loss between the two tubes. Ordinarily, the two risers should be separated by at least 100 feet or 0.1 times the inverse of the slope of the conduit, whichever is longer. It is preferred that the two risers are not separated by more than 1000 feet.

The distance 42 (see FIG. 1) between the risers 20, 30 can be accurately derived by ground survey and/or the as-built plans. The distance 44 (also see FIG. 1) between risers 20, 30 and the adjacent manhole 22, 32 must be set sufficiently apart such that no eddies and/or whirls from the manhole can propagate to the riser. Preferably this distance 44 is at least 5 feet. No lateral pipes and/or conduit size changes should occur between the risers. This is to ensure that the longitudinal friction loss is the only form of energy loss between two risers.

Under these conditions, the fluid's only energy loss between the two risers comes from friction loss. Therefore, calculating the friction derives the energy loss between the two risers. This can be done by using energy and continuity equations. Friction can be used to calculate the flow quantity.

As an example, for a pipe that is running at full capacity (pressure flow), friction loss can be calculated using the Reynolds number based on Darcy friction factors from Moody's diagram for turbulent and laminar flow or Hazen-Williams empirical C-value.

Likewise, for a pipe that is not running at full capacity (free surface), the friction loss can be calculated using the Colebrook Formula, another Reynolds-based friction factor for turbulent and laminar flow, or Manning's N-value for free surface uniform flow.

Example Hydraulic Analysis of the Flow Measurement System

Note: FIGS. 15-18 are analytical diagrams depicting the detailed flow rate and velocity derivations as documented below.

Figure 15:
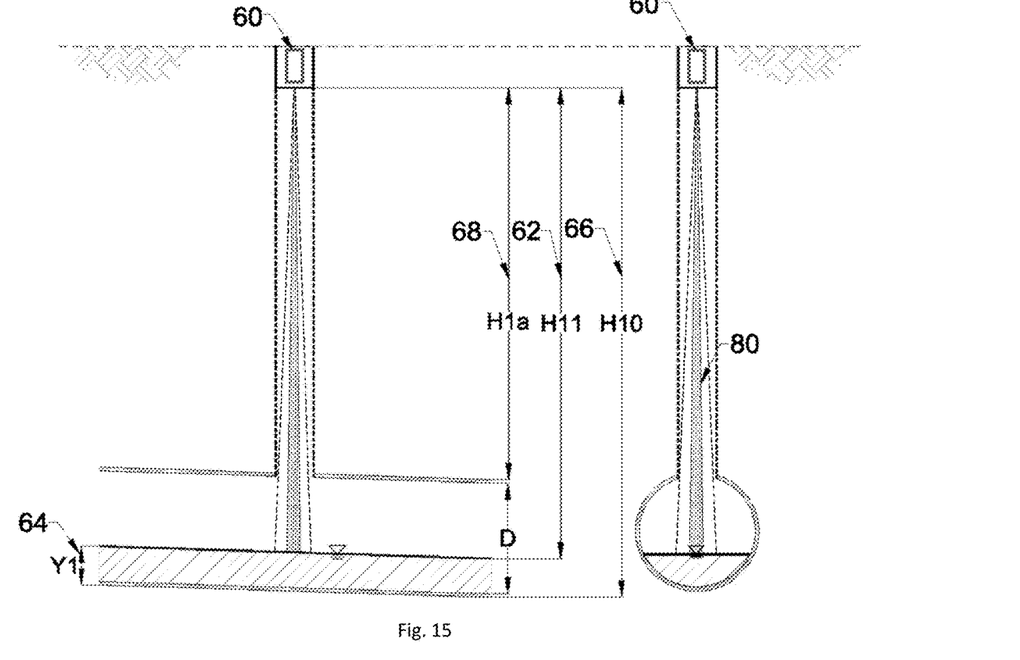
FIG. 15 illustrates hydraulic symbols used in the hydraulic flow equations.

Using the dimensions shown in FIG. 15, the sensor to the conduit invert distance (H10) 66 at the first riser 20 can be derived by summary of the distance from the distance-measuring sensor 60 lens to the conduit apex (H1a) 68, the conduit thickness (T) and the conduit diameter (D) as shown in the following equation:

$$H10 = H1a + T + D \quad \text{(Equation 1)}$$

The flow depth (Y1) 64 at the first riser 20 can be calculated by subtracting the sensor to water distance (H11) 62 from the sensor to the conduit invert distance (H10) 66, as shown $$Y1 = H10 - H11 \quad \text{(Equation 2)}$$

Similarly, at the second riser 30, $$H20 = H2a + T + D \quad \text{(Equation 3)}$$

$$Y2 = H20 - H21 \quad \text{(Equation 4)}$$

Figure 16:
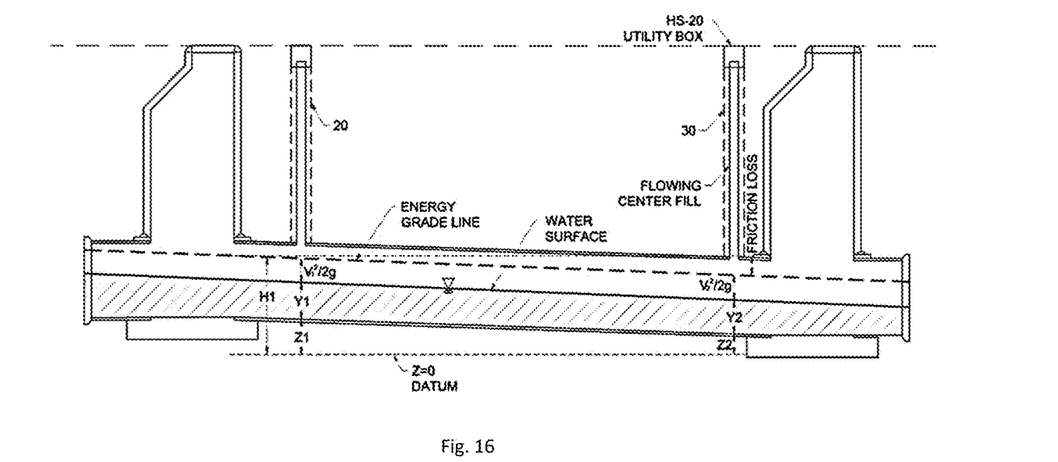
FIG. 16 illustrates open channel (free surface) conditions.

Datum derivation from FIG. 3, by recording the apex elevation (100) with reference to the adjacent manhole's culvert invert elevation (see FIG. 16) by a certified surveyor $$Z1 = \text{Apex elevation } (100) @ \text{riser } \#1 - T - D$$

$$Z2 = \text{Apex elevation } (100) @ \text{riser } \#2 - T - D$$

Deriving Flow Rates:

The flow quantity is derived based on energy equation at two risers (20, 30), which are to be balanced by the flow's friction loss travelling in the conduit from the first riser 20 to the second riser 30.

Friction loss for free surface flow (FIG. 16) can be determined by using Manning's n-value, Moody type diagram for free surface flow, or Reynolds number based friction factor equation such as Swamee-Jain equation.

Friction loss for full pipe flow (FIG. 17) can be derived from friction factors such as the Moody Diagram that covers friction factor for turbulent and laminar flow, Hazen-William's C-Value and other empirical established friction factors.

The velocities are derived by continuity equation Q=V*A.

Computational Bernoulli equations can be used for either steady flow or unsteady flow. For example, the distance between the first riser 20 and the second riser 30 is less than 600 feet and most sewers are designed with a velocity between 2.75 fps to 4 fps, the corresponding flow travel time is less than three and half minutes. The flow rates derived by applying the steady flow equation and the unsteady flow equation may have slight differences at the recorded time stamp. However, the difference is insignificant when plotting the entire 24-hour hydrograph and/or total flow quantities. The following demonstrate the flow rates derivation by using steady flow equations that require less process time when time stamps are as small as 10 milliseconds apart.

Nonetheless, the invention may also use unsteady flow equations if it provides better comfort level to the user.

Free Surface Flow (Open Channel), if Y1<D and Y2<D, FIG. 16

A. Bernoulli Equation with Manning's n-Value Friction (Steady-Laminar Flow)

$$E1 = E2 - HL \quad \text{(Equation 5)}$$

E1=energy at riser 30
E2=energy at riser 20
HL=head loss from riser 20 to riser 30

E1=Datum Z1+hydraulic depth (Y1 at riser 30)+velocity head ($V1^2/2g$ at riser 30)

E2=Datum Z2+hydraulic depth (Y2 at riser 30)+velocity head ($V1^2/2g$ at riser 20)

HL=Length (from riser 20 to riser 30)*Friction slope (Equation 6)

Friction slope can be expressed by Manning's n-value equation.

The friction slope for the length of the flow is the average of friction slopes at riser 20 and riser 30.

$$Z1 + Y1 + \frac{\left(\frac{Q}{A1}\right)^2}{2G} = Z2 + Y2 + \frac{\left(\frac{Q}{A2}\right)^2}{2G} - \left(L\left(\left(\frac{\left(\frac{Q}{A1}\right)}{\left(\frac{1.49}{n}\right)(R_h1^{2/3})}\right)^2 + \left(\frac{\left(\frac{Q}{A2}\right)}{\left(\frac{1.49}{n}\right)(R_h2^{2/3})}\right)^2\right)\right)^{1/2}$$

(Equation 7) Simplify equation 6 to unknowns at the left side of the equation for equation solving.

$$\frac{\left(\frac{Q}{A1}\right)^2}{2G} - \frac{\left(\frac{Q}{A2}\right)^2}{2G} + \left(L\left(\left(\frac{\left(\frac{Q}{A1}\right)}{\left(\frac{1.69}{n}\right)(R_h1^{2/3})}\right)^2 + \left(\frac{\left(\frac{Q}{A2}\right)}{\left(\frac{1.49}{n}\right)(R_h2^{2/3})}\right)^2\right)\right)^{\frac{1}{2}}$$

$$= Z2 + Y2 - Z1 - Y1$$

(Equation 8) Simplify the equation 7 by introducing specific K number for variable hydraulic parameters (A1, RH1 and RH2 for solving the equations

| | |
|---|---|
| $(Q/A1)^2/(2*g)$ | K1 $Q^2$ |
| $(Q/A2)^2/(2*g)$ | K2 $Q^2$ |
| $((Q/A1)/(1.49/n * R_{h1}^{2/3}))^2$ | K3 $Q^2$ |
| $((Q/A2)/(1.49/n * R_{h2}^{2/3}))^2$ | K4 $Q^2$ |
| $Z2 + Y2 - Z1 - Y1$ | K5 |

$$(K1)(Q^2) - (K2)(Q^2) + L\left(\frac{(K3)(Q^2) + (K4)(Q^2)}{2}\right) = K5$$

$$Q^2\left(\frac{K1 - K2 + L(K3 + K4)}{2}\right) = K5$$

$$Q^2 = \frac{K5}{\left(\frac{K1 - K2 + L(K3 + K4)}{2}\right)}$$

Solve for:

$$Q = \sqrt{\frac{k5}{\left(K1 - K2 + \frac{L(K3 + K4)}{2}\right)}}$$

$$V1 = \frac{Q}{A1} = \frac{Q}{f(Y1)}$$

$$V2 = \frac{Q}{A2} = \frac{Q}{f(Y2)}$$

B. Darcy-Weisbach Friction Factor for Friction Loss Between Risers

A form of the Colebrook-White equation exists for free surfaces. Such a condition may exist in a pipe that is flowing partially full of fluid. For free surface flow: it estimates fin free surface flows, which is valid under all the flow regimes (laminar, transition, and turbulent) is the following:

$$f = \left(\frac{24}{Reh}\right)\left[\frac{0.86e^{w(1.35Reh)}}{Reh}\right]^{2(1-a)b}\left\{\frac{134}{\left[\ln12.21\left(\frac{R_h}{e}\right)\right]^2}\right\}^{(1-a)(1-b)} \quad \text{(Equation 9)}$$

Where a is:

$$a = \frac{1}{1 + \left(\frac{Reh}{687}\right)^{8.4}}$$

And b is:

$$b = \frac{1}{1 + \left(\frac{Reh}{150\left(\frac{R_h}{e}\right)}\right)^{1.8}}$$

Where $Re_h$ is Reynolds number where h is the characteristic hydraulic length (hydraulic radius for 1D flows or water depth for 2D flows) and $R_h$ is the hydraulic radius (for 1D flows) or the water depth (for 2D flows). The Lambert W function can be calculated as shown next.

(Equation10) The Lambert W function in Equation 9 can be calculated as follows:

$$W(1.35Reh) = \ln1.35Reh - \ln\ln1.35Reh +$$

$$\left(\frac{\ln\ln1.35Reh}{\ln1.35Reh}\right) + \left(\frac{\ln[\ln1.35Reh]^2 - \ln\ln1.35Reh}{2[\ln1.35Reh]2}\right)$$

Figure 17:
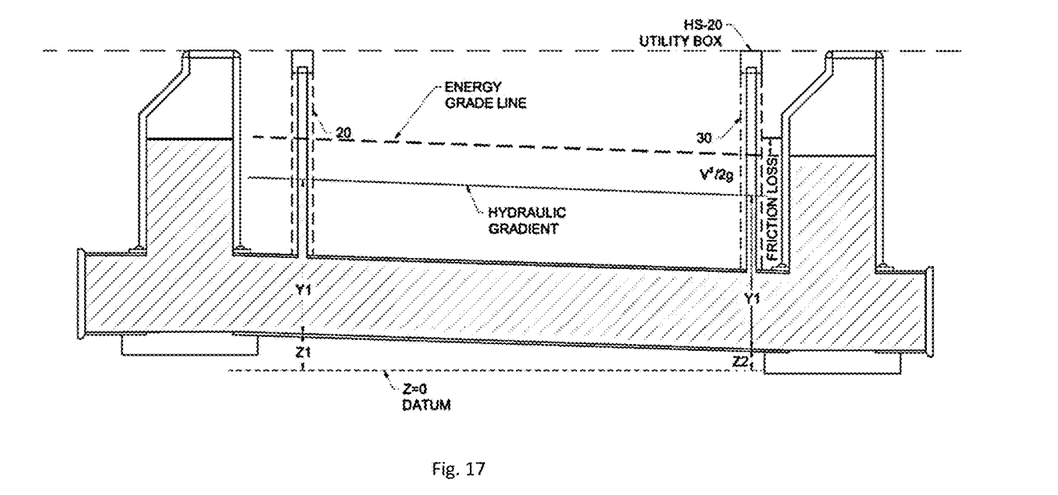
FIG. 17 illustrates pressure flow (pipe full) conditions.
Figure 18:
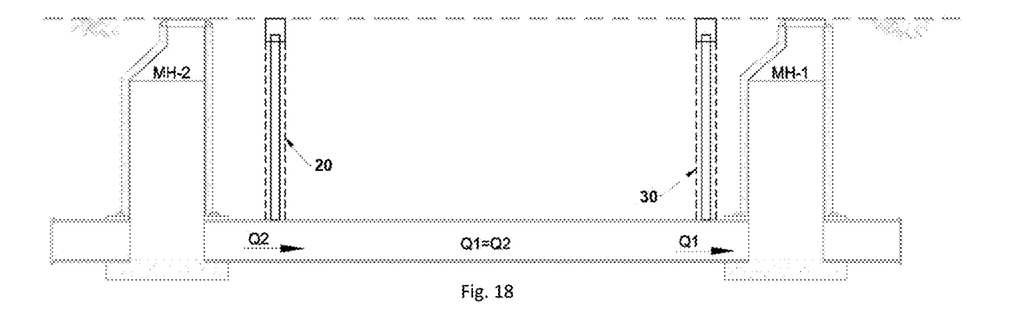
FIG. 18 illustrates flow continuity conditions.

C. Swamee and Jain have Developed the Following Simplified Equation to the Darcy Friction Factor $$f = 0.25\left[\log\left(\frac{e/D}{3.7} + \frac{5.74}{Re^{0.9}}\right)\right]^{-2} \quad \text{(Equation 11)}$$

in which f the Darcy friction factor
e roughness of the pipe
D inner diameter of the pipe
Re the Reynolds number Pressure Flow (Pipe Full), if Y1>D and Y2>D (FIG. 17)

A. Darcy-Weisbach Equation with Moody's Diagram for Friction Loss Between Risers Total Loss (dh) between riser-1 and riser-2 is total energy @ riser-2 (E2) minus total energy at riser-1 (E1) as shown in equation below:

$$dh = E2 - E1$$

$$dh = Y2 + \left(\frac{V22}{2G}\right) - Y1 - \left(\frac{V12}{2G}\right)$$

Friction slope is the head loss over the length as shown in equation below $$S = \frac{dh}{L}$$

Darcy-Weisbach Equation with Moody's diagram for friction loss as shown below $$\frac{dh}{L} = f\left(D\left(8\left(\overline{\frac{Q^2}{\pi^2(32.2D^5)}}\right)\right)\right) \quad \text{(Equation 12)}$$

$$S = \frac{fD(8)(Q^2)}{\pi^2(32.2(PipeDiameter^5))} \quad \text{(Equation 13)}$$

Combine equation (11) and (12)

$$\frac{dh}{L} = \frac{fD(8)(Q^2)}{\pi^2(32.2(PipeDiameter^5))} \quad \text{(Equation 14)}$$

With the pipe material known, absolute roughness can be found from material absolute roughness table published by the manufacturer.

Relative roughness (k/D)=(absolute roughness/1000/(pipe diameter*0.3048))

Found v (kinematic viscosity) for the conduit liquid specific density and temperature from physic property table Assume a friction factor f, and solve flow rate Q by Equation 14

Find corresponding Reynold number from equation as shown below $$ReD=VD/v$$

With the Reynold number and find corresponding friction factor f from Moody's diagram. (FIG. 10)

Repeat Equations c and d until f converges.

Flow Rate $(Q)$=$V$(velocity)*Pipe Area

Flow Velocity=$Q/A$

B. Bernoulli Equation with Hazen-William's C-Value Friction (Steady-Laminar Flow)

$$hf = 0.002083\left(L\left(\frac{100}{C^{1.85}}\right)\left(\frac{GPM1.85}{d^{4.8655}}\right)\right)$$

hf=friction head loss in feet of water from Riser #2 to Riser #1
c=Hazen-Williams roughness constant
q=volume flow (gal/min)
dh=inside hydraulic diameter (inches).

Example 1—Open Channel Flow

| pipe material | PVC | |
|---|---|---|
| Pipe Diameters (in) | 36 | fixed at installation site specific |
| Ppe Diameter in (ft) | 3.00 | |
| Pipe Radius in ft | 1.50 | |
| Manning's n | 0.011 | fixed at installation site specific |
| sewer slope | 1.0000% | fixed at installation site specific |
| Distance between station 1 and 2 | 500.00 | fixed at installation site specific |
| Z1 (base 1 elevation) | 0 | |
| Z2 (base 2 elevation) | 5 | |
| Data Sequence | 1 | |
| Date | Nov. 18, 2019 | |
| Times | 9:39:40 AM | |
| Sensor 1 reading (ft) | 17.00 | from sensor reading |
| Sensor 2 reading (ft) | 16.40 | from sensor reading |
| Sensor 1 to Soffit 1 distance (ft) | 15.25 | fixed at installation site specific |
| Sensor 2 to soffit 2 distance (ft) | 15.00 | fixed at installation site specific |
| cfs to gpm | 448.832566 | |
| cfs to MGD | 0.64631689 | |
| flow depth Y1 (ft) | 1.75 | |
| flow depth Y2 (ft) | 1.40 | |

Open Channel—Y<Pipe Diameter
Solving Q $Z_1+Y_1+(Q/A_1)^2/(2*g)=Z_2+Y_2+(Q/A_2)^2/(2*g)-L*(((Q/A_1)/(1.49/n*R_{H1}^{2/3}))^2+((Q/A_2)/(1.49/n*RH_2^{2/3}))^2))/2$ $(Q/A_1)^2/(2*g)-(Q/A2)2/(2*g)+L*(((Q/A1)/(1.49/n*RH12/3))^2+((Q/A2)/(1.49/n*RH22/3))^2))/2=Z_2+Y_2-Z1-Y1$ $K1*Q^2-K2*Q2+L*(K3*Q^2+K4*Q^2)/2=K5$ $Q^2*(K1-K2+L*(K3+K4)/2)=K5$ $Q^2=K5/((K1-K2+L*(K3+K4)/2))$ $Q=SQRT(K5/((K1-K2+L*(K3+K4)/2)))$ Solving Q Equation Breakdown

| (Q/A1) 2/(2*g) | 0.000847351 | K1 Q^2 |
|---|---|---|
| (Q/A2)2/(2*g) | 0.001484212 | K2 Q^2 |
| ((Q/A1)/(1.49/n * RH12/3)) ^2 | 7.09069E−05 | K3 Q^2 |
| ((Q/A2)/(1.49/n * RH22/3)) ^2 | 8.49553E−05 | K4 Q^2 |
| Z2 + Y2 − Z1 − Y1 | 4.65 | K5 |
| Q (cfs) | 11.0144937 | |
| Q (gpm) | 4943.66 | |
| Q (MGD) | 7.12 | |
| V1 | 2.57 | |
| V2 | 3.41 | |

Example 2—Pressure Flow

| pipe material | PVC |
|---|---|
| Pipe Diameters (in) | 36 |
| Ppe Diameter in (ft) | 3 |
| Pipe Radius in ft | 1.5 |
| Hazen Williams C | 120 |
| sewer slope | 1.00% |
| Distance between station 1 and 2 | 500 |
| Z1 (base 1 elevation) | 0 |
| Z2 (base 2 elevation) | 5 |
| Data Sequence | 1 |
| Date | Nov. 18, 2019 |
| Times | 9:39:40 AM |
| Sensor 1 reading (ft) | 14 |
| Sensor 2 reading (ft) | 13 |
| Sensor 1 to Soffit 1 distance (ft) | 15.25 |
| Sensor 2 to soffit 2 distance (ft) | 15 |
| cfs to gpm | 448.832566 |
| cfs to MGD | 0.64631689 |
| Total Energy 1 (ft) | 4.25 |
| Total Energy 2 (ft) | 10 |

By Hazen-Williams Formula $hf = 0.002083 \times L \times (100/C)^{1.85} \times (gpm^{1.85}/d^{4.8655})$ $gpm^{1.85} = hf \ast d^{4.8655}/(0.002083 \ast L \ast (100/C)^{1.85})$ $1.85 = 185/100$

| Breakdown | |
|---|---|
| Hf | 5.75 |
| L | 500 |
| d | |
| d^4.8655 | 37341333.02 |
| (100/C)^1.85 | 0.713698353 |
| gpm^1.85 | 288857529.8 |
| gpm | 37440.57732 |
| cfs | 83.41769326 |
| MGD | 53.91426406 |
| velocity | 11.80118953 |

$$x^{\frac{m}{n}} = x^{\left(\frac{1}{n} \times m\right)} = \left(x^{\left(\frac{1}{n}\right)}\right)^m = \left(\sqrt[n]{x}\right)^m$$

| nth root | number^(1/n) |
|---|---|
| | Power(number, m) |

By Darcy-Weibach $s = dh/L$ $S = fD \ast 8 \ast Q^2/(PI(\ )^2 \ast 32.2 \ast \text{Pipe diameter}^5)$ $dh/L = fD \ast 8 \ast Q^2/(PI(\ )^2 \ast 32.2 \ast \text{Pipe diameter}^5)$

| relative roughness (k/D) | 1.64042E–06 |
|---|---|
| Assume f | 0.01443 |
| Area sq-ft | 7.07 |
| V^2/2g = hfD/fL | |
| hf | 5.75 |
| L | 500 |
| D | 3 |
| V (fps) | 12.40850 |
| v (kinematic viscosity @ 60 dg) | 0.000122 |
| ReD = VD/v | 305127 |
| f | 0.014434371 |
| V | 12.4066218 |
| cfs | 87.69724179 |
| gpm | 39361 |
| MGD | 56.68020855 |
| velocity | 12.4066218 |

| Absolute Roughness (mm) | |
|---|---|
| PVC lined | 0.0015 |
| Clay | 0.7 |
| Asbestos Cement | 0.03 |
| Ductile Iron Epoxy lined | 0.01 |
| v (kinematic viscosity @ 60 dg) | 0.000122 |

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. An inline metering station for measuring free surface flow or pressure flow in an underground conduit, the inline metering station comprising:
a first riser located underground, the first riser comprising a distal end and a proximal end, the distal end of the first riser connected to the underground conduit, the first riser oriented perpendicular to a first apex of the underground conduit,
a second riser located underground, the second riser comprising a distal end and a proximal end, the distal end of the second riser connected to the underground conduit, the second riser oriented perpendicular to a second apex of the underground conduit, the first and second risers each comprising a length of at least three feet,
a first optical measuring device connected to the proximal end of the first riser, the first optical measuring device configured to measure a first distance through the first riser to a first fluid level,
a second optical measuring device connected to the proximal end of the second riser, the second optical measuring device configured to measure a second distance through the second riser to a second level, and
the first and second risers separated by a third distance, the third distance is at least 100 feet or 10 times the inverse of the slope of the underground conduit, whichever is longer,
wherein the first, second and third distances is used with a set of as-built conditions to calculate the free surface flow or pressure flow of fluid flowing in the underground conduit.

2. The inline metering station of claim 1 wherein the first fluid level is inside the first riser.

3. The inline metering station of claim 1, the first optical measuring device is also configured to measure the distance between the first optical measuring device and a sediment level in the underground conduit.

4. The inline metering station of claim 1 the first optical measuring device comprising an emitted beam, the emitted beam comprising a width at a top of the underground conduit that is less than an inside diameter of the first riser.

5. The inline metering station of claim 1 further comprising a manhole located a fourth distance from the first riser, the fourth distance being at least five times the diameter of the underground conduit from the manhole.

6. The inline metering station of claim 1 wherein the underground conduit comprises a uniform inside diameter between the first and second risers.

7. The inline metering station of claim 1 wherein the underground conduit comprises no connections between the first and second risers.

8. The inline metering station of claim 1 wherein the underground conduit comprises no slope change between the first and second risers.

9. The inline metering station of claim 1, the underground conduit further comprising a uniform inside surface roughness between the first and second risers.

10. The inline metering station of claim 1 wherein the underground conduit comprises a straight inside diameter between the first and second risers.

11. The inline metering station of claim 1 further comprising an instrument compartment connected to the proximal end of the first riser, the instrument compartment housing communication devices connected to the first and second optical measuring devices.

12. The inline metering station of claim 11, wherein the inline metering station is accesible from above ground.

13. The inline metering station of claim 1 further comprising a dehumidifier system connected to the proximal end of the first or second riser.

14. The inline metering station of claim 13, the dehumidifying system further comprising a humidity sensor and recirculating pipe.

15. A method of measuring free surface flow or pressure flow in an underground conduit comprising,
   optically measuring a first distance through a first riser to a first fluid level, the first riser comprising a distal end and a proximal end, the distal end of the first riser connected to the underground conduit, the first riser oriented perpendicular to a first apex of the underground conduit,
   optically measuring a second distance through a second riser to a second fluid level, the second riser comprising a distal end and a proximal end, the distal end of the second riser connected to the underground conduit, the second riser oriented perpendicular to a second apex of the underground conduit, the first and second risers each comprising a length of at least three feet,
   obtaining as-built conditions, the as-built conditions comprising a slope of the underground conduit, a cross-sectional area of the underground conduit, a distance between the two risers of at least 100 feet or 0.1 times the inverse of the slope of the underground conduit, and a surface material inside the conduit,
   calculating the free surface flow or the pressure flow of fluid flowing in the underground conduit.

16. The method of claim 15 further comprising reporting the free surface flow or the pressure flow to a stakeholder.

17. The method of claim 15 further comprising calculating depth of sediment deposit in the underground conduit.

* * * * *